O. FACHMAN.
WIRE WRAPPING TOOL.
APPLICATION FILED DEC. 18, 1919.
1,340,029.
Patented May 11, 1920.
2 SHEETS—SHEET 1.
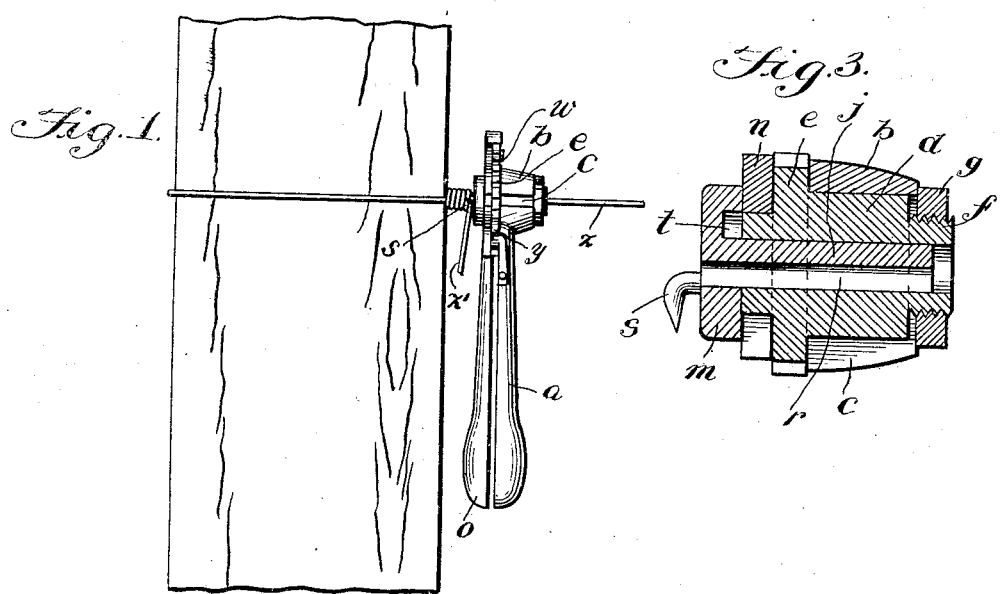
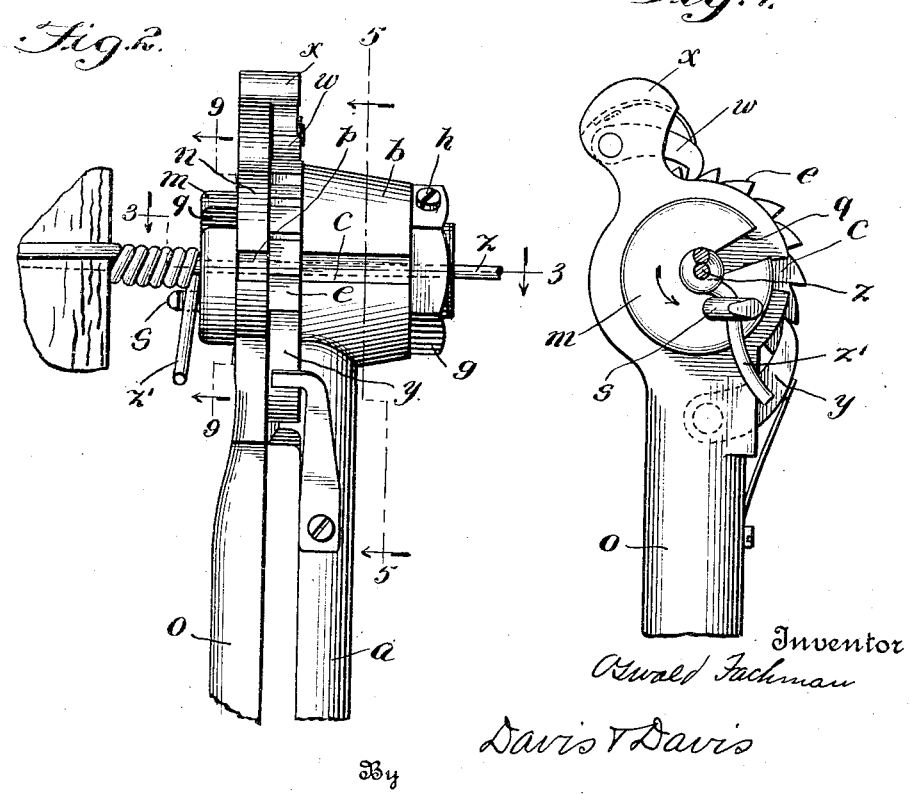
Inventor
Oswald Fachman
By Davis & Davis
Attorneys

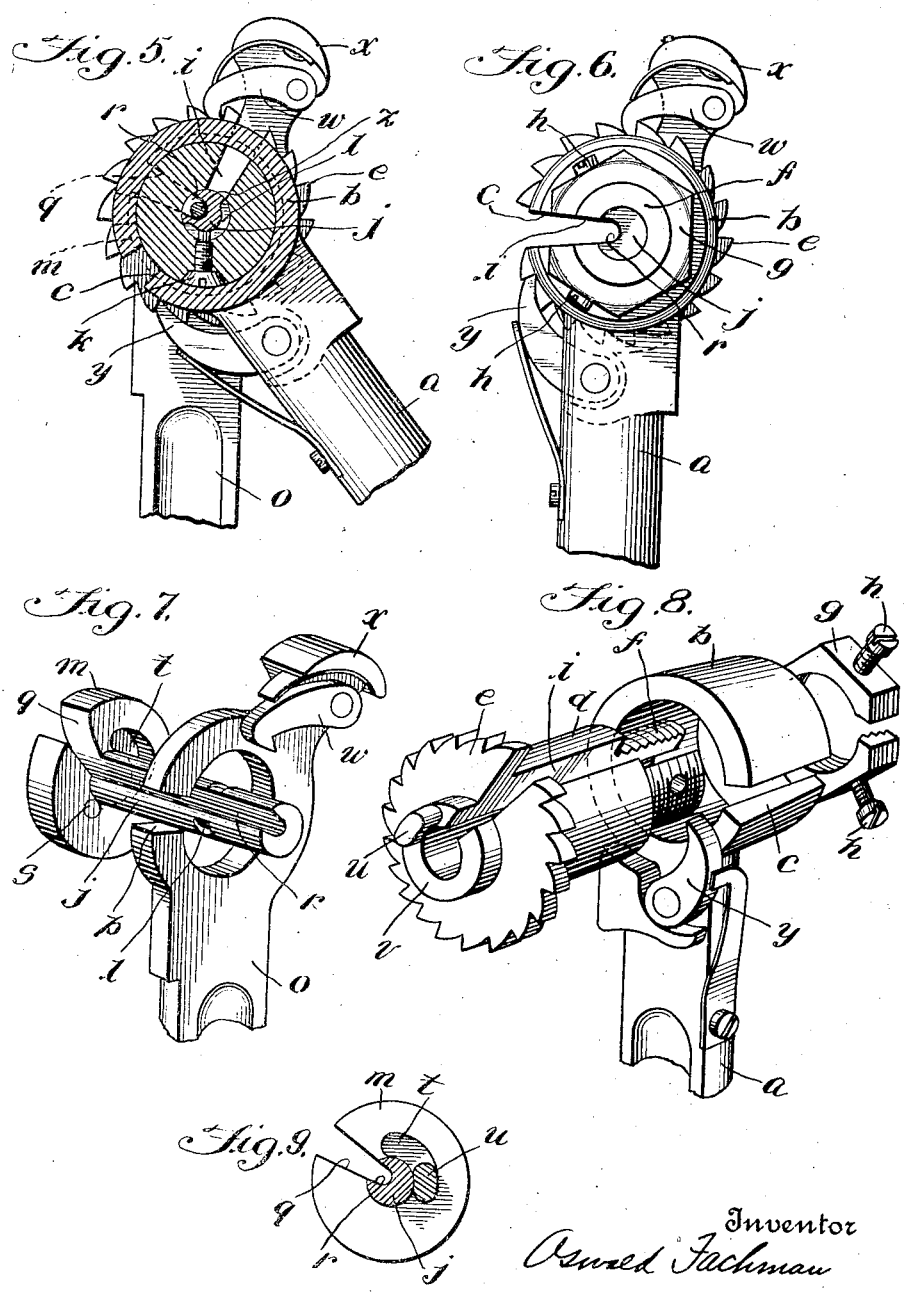

UNITED STATES PATENT OFFICE.

OSWALD FACHMAN, OF LINDSEY, OHIO.

WIRE-WRAPPING TOOL.

1,340,029.  Specification of Letters Patent.  Patented May 11, 1920.

Application filed December 18, 1919. Serial No. 345,829.

*To all whom it may concern:*

Be it known that I, OSWALD FACHMAN, a citizen of the United States of America, and a resident of Lindsey, county of Sandusky, and State of Ohio, have invented certain new and useful Improvements in Wire-Wrapping Tools, of which the following is a full and clear specification.

The object of this invention is to provide a simple manually-operable device for twisting or wrapping the end of a wire around a straight wire, and it is particularly adapted for fastening the end of fence wire around a fence-post in that class of fences where the horizontal strands are so close together as to prevent the operation of a lever in a complete circle around the main wire, as more fully hereinafter set forth.

Figure 1 is a side elevation of the device showing it in operation on a fence wire;

Fig. 2 is a similar view enlarged with parts of the handle broken away;

Fig. 3 is a section on the line 3—3 of Fig. 2;

Fig. 4 is an end elevation;

Fig. 5 is a section on the line 5—5 of Fig. 2;

Fig. 6 is an end view looking at the end opposite to that shown in Fig. 4;

Figs. 7 and 8 are perspective views showing the parts disassembled;

Fig. 9 is a section on the line 9—9 of Fig. 2.

Referring to the drawings annexed by reference-characters, *a* designates a lever provided with a hub *b* which is provided with a radial slot *c* leading to the central recess in the hub. Journaled in this central recess is the hub *d* of a ratchet-wheel *e*, said hub being provided with a threaded end *f* on which is screwed a clamp-nut *g*, this nut being adapted to bear against one end of the hub *b* and to draw the face of the ratchet-wheel against the opposite end of the hub with a frictional contact, said nut *g* being locked in its adjusted position by means of one or more set-screws *h*. The ratchet-wheel and its hub *d* are provided with a radial slot *i* which is adapted to register at a certain time in the operation with the slot *c* in the hub *b*.

Journaled in a central passage formed through the hub *d* and its ratchet-wheel is a shaft *j* which is locked against endwise withdrawal by means of a set-screw *k* tapped radially through the hub *d*, the inner end of this screw entering a circumferential groove *l* formed in said shaft *j*. On the end of this shaft *j* that is adjacent to the ratchet-wheel is formed a disk *m* which bears frictionally against the disk-like end *n* of a lever *o* which latter lies alongside the lever *a* and is a companion thereto, the exterior surface of both levers being rounded off so that the two levers may be grasped as one and manipulated as one in a certain operation of my tool hereinafter described. The flat disk-like end *n* is provided with a radial slot *p* which is adapted to register at a certain time in the operation with slots *c* and *i*, and likewise the flange *m* is provided with a radial slot *q*, the inner end of this slot being extended inwardly to the other end of the shaft *j*, so as to form a groove *r* which extends entirely through the device. Affixed to the outer face of the flange *m* is a hook *s* which opens radially outwardly and is set at a distance from the center of rotation of the flange so that it will be bodily rotated a complete revolution when said flange *m* is rotated. The inner face of the flange *m* is provided with an arcuate groove *t* into which extends an axially-projecting lug *u* formed on the outer face of the hub *v*, said hub *v* being formed on the outer face of the ratchet-wheel and on which the disk-end *n* of lever *o* is pivoted.

A hooked spring-actuated pull-pawl *w* is pivotally mounted on a lug *x* formed on the disk *n*, and a spring-actuated push-pawl *y* is mounted on the companion lever *a*.

In operation, the rotatable parts are adjusted to bring all the slots in radial alinement, as shown in Fig. 6. Then the tool is adjusted so that the main wire *z* will lie in the groove *r*, with the hook *s* adjacent to the fence-post. Then the disk-like flange *m* is rotated by the fingers of the operator as far as the lug *u* and its groove *t* will permit it to be rotated. This rotation of the disk *m* of course carries with it the shaft *j*, but none of the other parts rotate at this time. This rotation of disk *m* carries its slot *q* out of alinement with the other slots and thus locks the main strand *z* from withdrawal out through said other slots. The tool is then ready for the wrapping or twisting operation. The tool is then moved up close to the post and the free end *z'* of the wire is laid in the hook *s*. Then, by manipulating the levers *a* and *o* back and forth in opposite directions (or by holding one lever still and reciprocating the other), the ratchet-wheel will be given a step-by-step rotary movement independently of the two hubs $b$ and $n$ of the levers. This rotary movement of the ratchet-wheel will, through the medium of the lug $u$, carry around with it the flange $m$ and thus impart to the hook $s$ a bodily rotary movement around the main strand $z$. Thus carrying the hook $s$ in a path around the main strand of wire causes the free end $z'$ of the wire to be wrapped tightly around said main strand in consecutive, closely-spaced coils.

The foregoing operation is particularly desirable where the horizontal strands of the fence are located so close together as to prevent a free complete rotary movement of the wrapping tool. My device, however, can be effectually used in those cases where the wires are far enough apart to permit a complete rotation of the tool around the main strand. In such cases as these, it is simply necessary to grasp both handles $a$ and $o$ and hold them together while the tool is being bodily rotated. When the tool is used in this manner, it will be understood, of course, that the ratchet devices are not operated and that the tool acts as a simple lever pivoted on the main strand as a center of rotation.

The nature and scope of the invention having been thus indicated and its preferred embodiment having been specifically described, what is claimed as new is, 1. In a wire-wrapping tool, a pair of levers each carrying a pawl, a ratchet-wheel arranged between the levers and having hubs on which said levers are journaled, said levers and ratchet-wheel and hubs being radially slotted, a hook-carrying disk journaled in said ratchet-wheel and provided with a shaft having a main-strand-receiving groove extending its full length, said disk being provided with a radial slot, means being provided to permit the disk to have a limited rotary movement independent of the ratchet-wheel hubs.

2. In a tool of the class described, a pair of companion handles spaced sufficiently closely together to be grasped together by one hand, a ratchet-wheel having hubs on which said handles are journaled, each of said handles carrying a pawl, one being a pull-pawl and the other being a push-pawl, a flange carrying a hook and also a shaft extending through and journaled in said ratchet-wheel and hubs, said handles, ratchet-wheel and hubs, and flanges and shaft being slotted for the purpose set forth, means being provided for causing the flange and its shaft to rotate with the ratchet-wheel but permitting it to have an independent limited rotary motion.

3. In a wire-wrapping tool, a pair of levers each carrying a pawl, a ratchet-wheel arranged between the levers and having hubs on which said levers are journaled, said levers and ratchet-wheel and hubs being radially slotted, a hook-carrying disk journaled in said ratchet-wheel and provided with a shaft having a main-strand-receiving groove extending its full length, said disk being provided with a radial slot, means being provided to permit the disk to have a limited rotary movement independent of the ratchet-wheel hubs, said means consisting of a groove formed in the disk and a co-acting lug formed on one of the hubs of the ratchet-wheel.

In testimony whereof I hereunto affix my signature.

OSWALD FACHMAN.